United States Patent
Nariyambut Murali et al.

(10) Patent No.: US 10,229,363 B2
(45) Date of Patent: Mar. 12, 2019

(54) PROBABILISTIC INFERENCE USING WEIGHTED-INTEGRALS-AND-SUMS-BY-HASHING FOR OBJECT TRACKING

(71) Applicant: Ford Global Technologies, LLC, Dearborn, MI (US)

(72) Inventors: Vidya Nariyambut Murali, Sunnyvale, CA (US); Sneha Kadetotad, Sunnyvale, CA (US); Daniel Levine, San Mateo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 662 days.

(21) Appl. No.: 14/887,031

(22) Filed: Oct. 19, 2015

(65) Prior Publication Data

US 2017/0109644 A1    Apr. 20, 2017

(51) Int. Cl.
  *G06N 7/00*   (2006.01)
  *G06N 99/00*  (2010.01)

(52) U.S. Cl.
  CPC ........... *G06N 7/005* (2013.01); *G06N 99/005* (2013.01)

(58) Field of Classification Search
  CPC combination set(s) only.
  See application file for complete search history.

(56) References Cited

U.S. PATENT DOCUMENTS

| | | | |
|---|---|---|---|
| 6,169,940 B1 † | 1/2001 | Jitsukata | |
| 6,657,584 B2 † | 12/2003 | Cavallaro | |
| 6,862,537 B2 | 3/2005 | Skrbiria | |
| 7,542,825 B2 | 6/2009 | Kawasaki | |
| 9,721,472 B2 * | 8/2017 | Jain | G08G 1/167 |
| 9,829,888 B2 * | 11/2017 | Reiff | B60W 30/12 |
| 9,889,716 B2 * | 2/2018 | Banvait | B60G 17/0162 |
| 9,940,625 B2 * | 4/2018 | Levine | G06F 17/30241 |
| 9,975,547 B2 * | 5/2018 | Myers | G08G 1/0112 |

(Continued)

FOREIGN PATENT DOCUMENTS

| | | |
|---|---|---|
| EP | 1884795 | 9/2010 |
| KR | 101503473 | 3/2015 |
| WO | WO-2014183948 | 11/2014 |

OTHER PUBLICATIONS

Auslander et al., Maritime Threat Detection Using Probabilistic Graphical Models, Proceedings of the Twenty-Fifth International Florida Artificial Intelligence Research Society Conference, Dec. 2012.*

(Continued)

*Primary Examiner* — Michael B Holmes
(74) *Attorney, Agent, or Firm* — David R. Stevens; Stevens Law Group

(57) ABSTRACT

Systems, methods, and devices for sensor fusion are disclosed herein. A system for sensor fusion includes one or more sensors, a model component, and an inference component. The model component is configured to calculate values in a joint-probabilistic graphical model based on the sensor data. The graphical model includes nodes corresponding to random variables and edges indicating correlations between the nodes. The inference component is configured to detect and track obstacles near a vehicle based on the sensor data and the model using a weighted-integrals-and-sums-by-hashing (WISH) algorithm.

20 Claims, 6 Drawing Sheets

(56) References Cited

U.S. PATENT DOCUMENTS

| | | | |
|---|---|---|---|
| 10,048,691 B2* | 8/2018 | Reiff | B60W 30/12 |
| 10,096,263 B2* | 10/2018 | Jain | G09B 5/06 |
| 2014/0035775 A1 | 2/2014 | Zeng | |
| 2016/0210383 A1* | 7/2016 | Alaniz | G06F 17/5009 |
| 2016/0210775 A1* | 7/2016 | Alaniz | G05D 1/0088 |
| 2017/0221365 A1* | 8/2017 | Banvait | B60G 17/0165 |
| 2018/0081057 A1* | 3/2018 | Myers | G01S 19/48 |
| 2018/0281680 A1* | 10/2018 | Gerardo Castro | B60R 1/00 |
| 2018/0300620 A1* | 10/2018 | Gerardo Castro | G06N 3/08 |

OTHER PUBLICATIONS

Ermon et al., Taming the Curse of Dimensionality: Discrete Integration by Hashing and Optimization, Feb. 15, 2013.*

Learning Traffic Flow Dynamics using Random Fields, Deepthi Mary Dilip, DianChao Lin, and Saif Eddin Jabari, Jun. 22, 2018, pp. 1-18.*

Sensors Effective World Modeling: Multisensor Data Fusion Methodology for Automated Driving, Jos Elfring, Rein Appeldoorn, Sjoerd van den Dries and Maurice Kwakkernaat, 2016, pp. 1-27.*

IEEE Explore Digital Library Learning the Dynamics of Arterial Traffic From Probe Data Using a Dynamic Bayesian Network IEEE Transactions on Intelligent Transportation Systems (vol. 13 , Issue: 4 , Dec. 2012) pp. 1679-1693, Aude Hofleitner, Ryan Herring, Peter Abbeel, Alexander Bayen.*

Chalmers University ofr Technology Gothenburg, Sweden 2017 Probabilistic Modelling of Sensors in Autonomous Vehicles Autoregressive Input/Output Hidden Markov Models for Time Series Analysis Master's thesis in Engineering Mathematics and Computational Science Edvin Listo Zec pp. 1-30.*

Ermon, Stefano, Carla Gomes, Ashish Sabharwal, and Bart Selman. "Taming the curse of dimensionality: Discrete integration by hashing and optimization." In Proceedings of the 30th International Conference on Machine Learning (ICML-13), pp. 334-342. 2013.†

* cited by examiner
† cited by third party

PROBABILISTIC INFERENCE USING WEIGHTED-INTEGRALS-AND-SUMS-BY-HASHING FOR OBJECT TRACKING

TECHNICAL FIELD

The disclosure relates generally to methods, systems, and apparatuses for automated driving or for assisting a driver, and more particularly relates to methods, systems, and apparatuses for object detection and tracking.

BACKGROUND

Autonomous vehicles and driving assistance systems are currently being developed and deployed to provide safety, reduce an amount of user input required, or even eliminate user involvement entirely during driving of a vehicle. For example, some driving assistance systems, such as crash avoidance systems, may monitor driving, positions, and velocities of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads, observe their surroundings and avoid objects.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
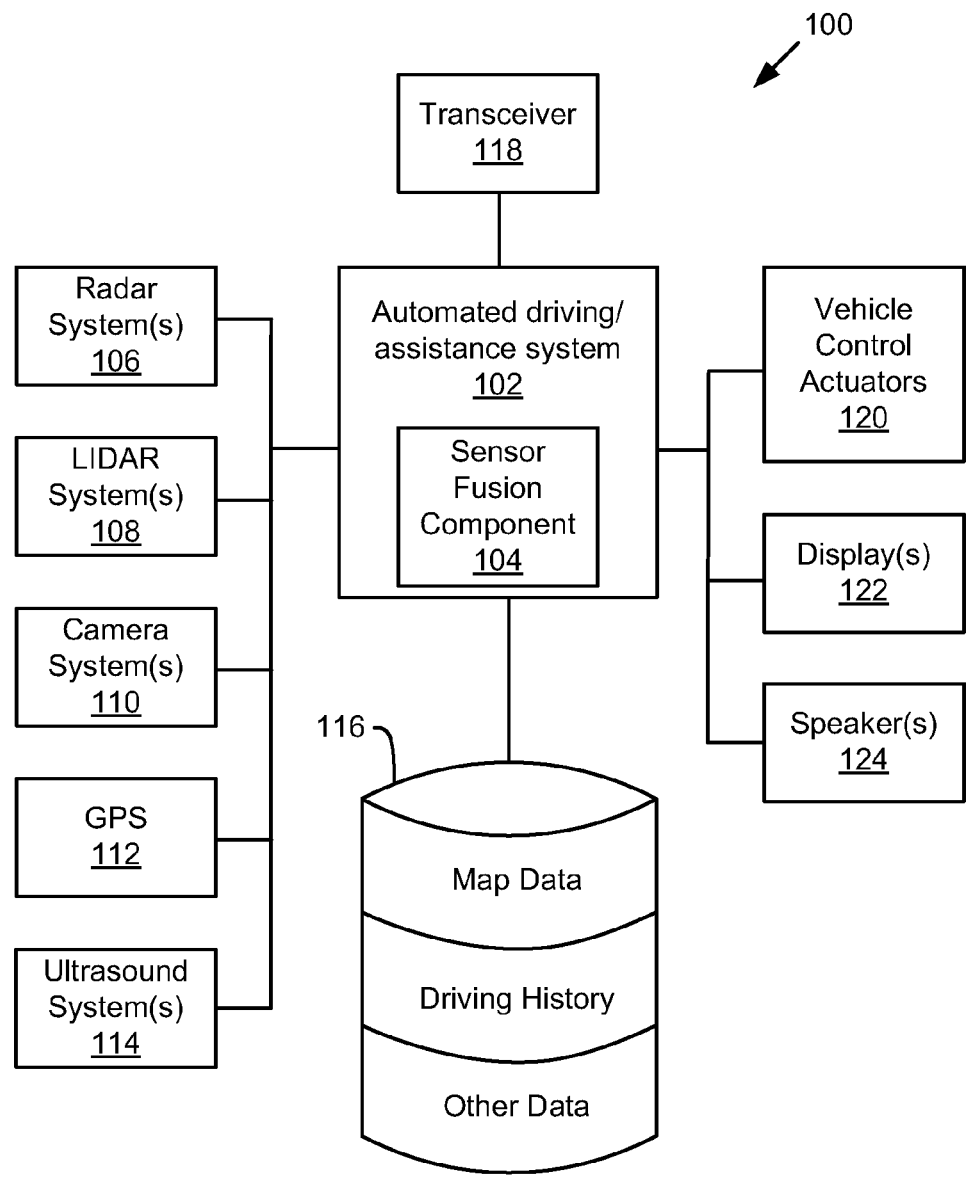
FIG. 1 is a schematic block diagram illustrating an implementation of a vehicle control system that includes an automated driving/assistance system.

Availability of multi-modal sensors (cameras, radars, ultrasonics) on a vehicle, each with their unique strengths and weaknesses, and with complimentary properties, allows a system to leverage the sensors in a synergistic way to perform accurate and robust object detection and tracking. Utilizing multiple sensors in a way that enhances their strengths, rather than their weaknesses, requires high-fidelity models and advanced algorithmic techniques. Off-the-shelf probabilistic inference and modeling technology, like Kalman filters, are restricted to Gaussian, unimodal dynamics and use Markov chain models to represent the probabilistic system, which suffers from having too sparse sampling and low guarantees on safety.

Furthermore, sensor fusion algorithms (like Kalman filtering, Markov Chain Monte-Carlo (MCMC) sampling etc.) are either not scalable or not accurate enough for object detection and tracking MCMC techniques are still the most widely used and are the workhorse of statistical inference. Unfortunately, such methods typically do not provide tight guarantees on the accuracy of the results. At least some approaches disclosed herein introduce a fundamentally new paradigm for statistical inference, which is a very different and promising alternative to these existing techniques and yields provably accurate results in a range of problem domains.

The present disclosure proposes application of an inference and decision-making technique based on dimensionality reductions to sensor fusion problems. One recently developed example is the Weighted-Integrals-And-Sums-By-Hashing technique or algorithm (WISH) disclosed in "Taming the Curse of Dimensionality: Discrete Integration by Hashing and Optimization" by Stefano Ermon, Carla Gomes, Ashish Sabharwal, and Bart Selman, presented in the Proceedings of the International Machine Learning Society, 2013, which is hereby incorporated herein in its entirety by this reference. In one embodiment, the use of the WISH algorithm or other dimensionality reduction algorithms work well when the underlying statistical models combine probabilistic information with causal or deterministic constraints arising from domain knowledge (such as physical laws).

In one embodiment, methods of the present disclosure may be understood as including two or more levels. The first level may include creation of a joint-probabilistic graphical model that captures the uncertainty and relationship between different sensors. In one embodiment, the joint-probabilistic graphical model is created using rigorous theoretical analysis with a principled experimental component, drawing upon ideas from probabilistic reasoning, constraint optimization and machine learning. In one embodiment, the joint-probabilistic graphical model includes continuous parameters (such as for speed, position, velocity, or the like) as well as discrete parameters (such as sensor failure status, occupancy of a region by an object, or the like) modeled within it. These parameters, in one implementation, enable the estimate of an object's position and velocity, a metric for determining the confidence level of finding the position and velocity, and/or discrete detection/tracking of a sensor's failure (confidence level). Based on information obtained from the model, an inference technique like the WISH algorithm may then be used to perceive and understand the scene around the vehicle. The result of the WISH algorithm may include confidence bounds for different inferences and hence provide probabilistic safety to the system. It will be appreciated that the WISH algorithm is a better approach for object detection than existing Monte Carlo estimation techniques in terms of accuracy, robustness and convergence rates and is highly scalable and parallelizable.

In one embodiment, in order to generate a graphical model for a specific sensor/vehicle system, sensor data is collected from a variety of sensors positioned on a vehicle and driven through multiple real-life scenarios or scenarios created in a virtual driving environment. The data gathered from real-world and virtual-world scenarios may be used for developing the joint-probabilistic graphical model. This model may include learning parameters developed through deep learning concepts as well as incorporation of physical system knowledge. The WISH algorithm may then be used for refining or defining parameters. The WISH algorithm may then be used for inference and decision making in the scene for different discrete and continuously tracked variables, such as position and speed as well as the discrete components, such as sensor failure. Virtual data may be obtained via Simulink® models (or other models) that have been developed and used to test the functioning of the algorithm. The accuracy of the algorithm is determined by comparison with ground truth obtained from the virtual environment. After virtual testing, the algorithm may then be tested on real-world data collected for various scenarios. An exploration of different levels of fusion of sensor data is performed to analyze the best level at which information fusion should take place for different applications.

As discussed above, one embodiment of a sensor fusion approach may include a two-layered system with one part focusing on creating a single joint-probabilistic model of the dynamics of a system (such as of a vehicle and sensors) and a second part that may be used to infer different insights based on the model. In one embodiment, the joint-probability graphical model may be hard-coded or may be learned and modified using artificial intelligence or machine learning.

One or more approaches for performing sensor fusion presented herein are different than the state-space approach for other methods that have a single model performing the fusion. The one or more approaches for performing sensor fusion differ from the state-space filtering, because fusion takes place at both levels, namely at the probabilistic model level and also at the inference level above it. Additionally, unlike existing systems, one or more approaches provided herein provide a quantitative confidence measure of safety of the inference. Compared to existing techniques, embodiments of the present disclosure are highly scalable, parallelizable, and converge significantly faster, which are all advantageous for active safety. Thus the present disclosure enables accurate detection and tracking of obstacles in an environment by fusing information from multi-modal sensors to aid in development of driver-assist features and capabilities for autonomous driving.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, in-dash computers, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 includes a sensor fusion component 104, which may detect or track objects based on a graphical model of a vehicle corresponding to the control system 100 and data gathered by one or more sensors. For example, the sensor fusion component 104 may infer a location, speed, velocity, object type, or any other details about physical objects near the vehicle. Additionally, the sensor fusion component 104 may also determine a confidence level in one or more details about physical objects or obstacles.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The one or more sensor systems/devices may include any other sensors, such as wheel encoders to detect the speed of the vehicle and/or the distance rotated by the wheels of the vehicle or other sensors to detect other objects or detect a location or movement of the vehicle.

The vehicle control system 100 may include a data store 116 for storing relevant or useful data for navigation and safety such as a driving history, map data, or other data. In one embodiment, the data store 116 may store a joint-probabilistic graphical model that models the system 100, including any sensors of the system 100. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle, such as electric motors, switches or other actuators to control braking, acceleration, steering or the like. The vehicle control system 100 may also include one or more displays 122, speakers 124, or other devices so that notifications to a human driver or passenger may be provided. The display 122 may include a heads-up display, a dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the sensor fusion component 104 may be separate from the automated driving/assistance system 102 and the data store 116 may be included as part of the automated driving/assistance system 102 and/or part of the sensor fusion component 104.

The radar system 106 may include any radar system well known in the art. Radar system 106 operation and performance is generally well understood. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data about objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many commercially available radar systems. In one embodiment, the radar system 106 may provide perception data including a two-dimensional or three-dimensional map or model to the automated driving/assistance system 102 for reference or processing.

The LIDAR system 108 may include any LIDAR system known in the art. Principles of operation and performance of LIDAR systems are generally well understood. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many commercially available LIDAR systems. In one embodiment, the LIDAR system 108 may provide perception data including a two-dimensional or three-dimensional model or map of detected objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detect a distance) for objects within view.

The GPS system 112 is one embodiment of a positioning system that may provide a geographical location of the vehicle based on satellite or radio tower signals. GPS systems 112 are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasound waves. For example, the ultrasound system 114 may emit ultrasonic waves from a location on or near a bumper or side panel location of a vehicle. The ultrasonic waves, which can travel short distances through air, may reflect off other objects and be detected by the ultrasound system 114. Based on an amount of time between emission and reception of reflected ultrasonic waves, the ultrasound system 114 may be able to detect accurate distances between a parent vehicle and other vehicles or any other objects. Due to its shorter range, the ultrasound system 114 may be more useful to detect objects during parking, detect imminent collisions during driving, or detect nearby vehicles or objects during parking or driving.

In one embodiment, the data from radar system(s) 106, LIDAR system(s) 108, camera system(s) 110, and ultrasound system(s) 114 may be processed by the sensor fusion component 104 to quickly and accurately obtain information about nearby objects, such as their position, speed relative to the vehicle, direction of travel, shape, or the like. In one embodiment, the sensor fusion component 104 obtains more accurate information about an object than any single sensor system (or any single sensor type) can obtain independently.

The data store 116 stores map data, a driving history, a probabilistic graphical model, and/or other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for each parking stall in a parking lot or for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub-meter accuracy. The map data may also include location data for paths, dirt roads, or other roads or paths, which may be driven by a land vehicle.

The driving history (or drive history) may include location data and/or sensor data for past trips or parking locations of the vehicle. For example, the driving history may include GPS location data for the previous trips or paths taken. As another example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle. As yet another example, the driving history may include detailed sensor data for events experienced by the vehicle, including resulting events. In one embodiment, the automated driving/assistance system 102 is configured to log driving data to the data store 116 for and during any trips or drives taken by the vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle may also be referenced herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, other traffic, accidents, road conditions, the locations of parking barriers or parking chocks, or any other details that may assist the vehicle and/or automated driving/assistance system 102 in driving accurately or safely.

The transceiver 118 may receive signals from other signal sources that are at fixed locations. In one embodiment, receiving or sending location data from devices or towers at fixed locations is referenced herein as vehicle-to-infrastructure (V2X) communication. In one embodiment, the term V2X communication may also encompass V2V communication.

In one embodiment, the transceiver 118 may send and receive location data, sensor data, decision making data, or any other data via a mobile network or cell connection. For example, the transceiver 118 may receive updated data for a probabilistic graphical model, or other configuration data for sensors. In one embodiment, the transceiver 118 may send and receive data regarding the detection and tracking of objects for storage on a remote server, such as part of a cloud service for improving sensor fusion algorithms.

In one embodiment, the automated driving/assistance system 102 is configured to control driving or navigation of a parent vehicle. For example, the automated driving/assistance system 102 may control the vehicle control actuators 120 to drive a path on a road, a parking lot, a driveway or other location. For example, the automated driving/assistance system 102 may determine a path and a speed to drive based on information or perception data provided by any of the components 106-118. In one embodiment, the sensor fusion component 104 is configured to make inferences or decisions regarding details of obstacles. For example, the sensor fusion component 104 may provide locations, velocities, or other information about objects to a navigation or driving system so that the objects can be avoided.

Figure 2:
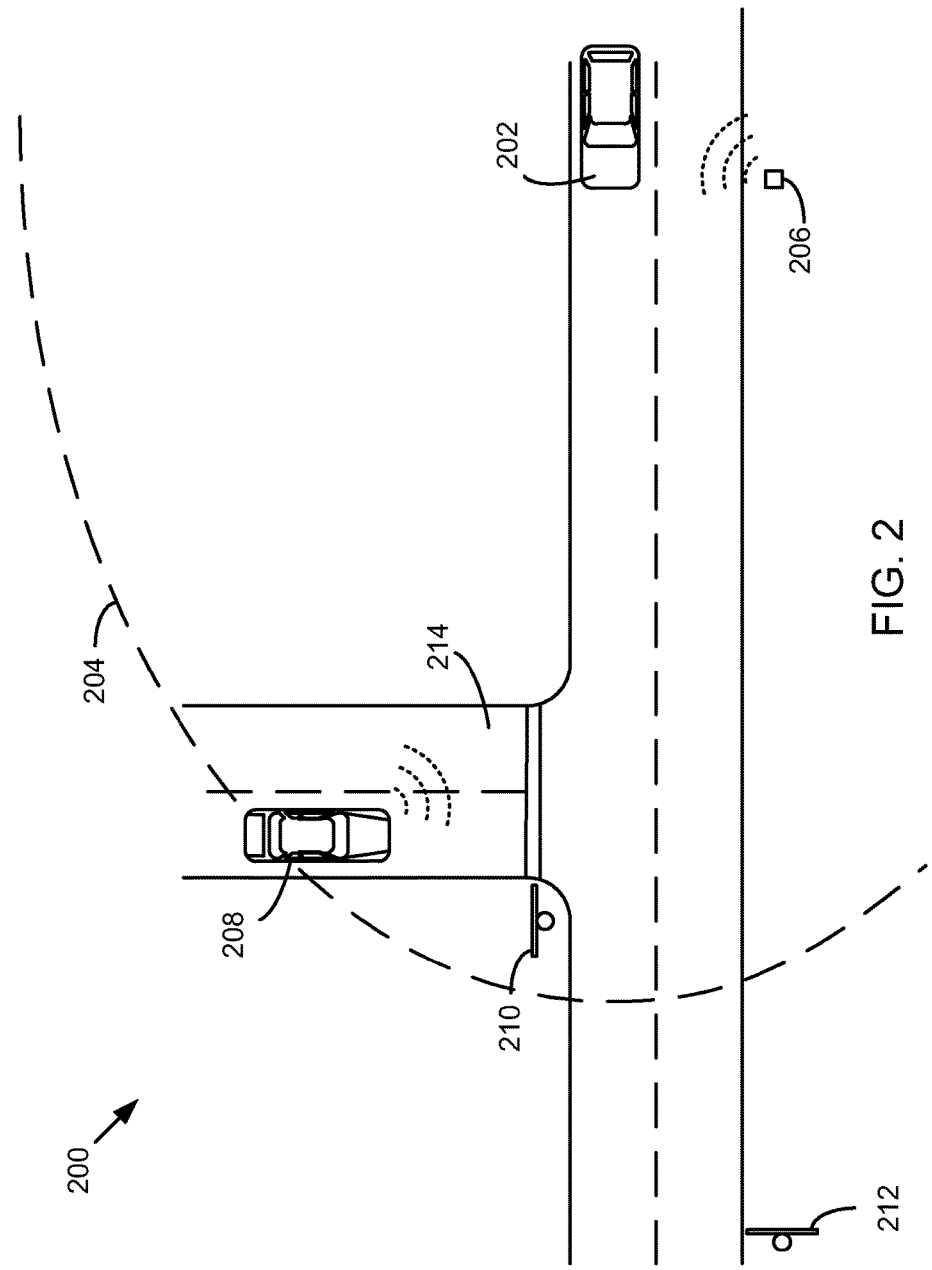
FIG. 2 is a schematic diagram illustrating a top view of an example road environment.

FIG. 2 is a schematic top view of a road 200 with a vehicle 202 traveling on the road 200. The vehicle 202 may include the system 100 of FIG. 1. In one embodiment, one or more sensors, such as a camera system 110 of the vehicle may have a viewing area 204 indicated by arcuate, dotted lines. The viewing area is illustrative only and may extend in any direction or all directions around the vehicle 202. Furthermore, the region covered by a sensor may be larger or smaller based on sensor type, orientation, or the like. The vehicle 202, or a sensor fusion component 104 of the vehicle 202, may receive sensor data that includes information about objects, surfaces, or the like within the viewing area 204 and make inferences about object location, velocity, or the like. In one embodiment, the presence of certain objects or environmental attributes may be determined by the vehicle 202 based on the data gathered within the viewing area 204. In one embodiment, the vehicle 202 may process sensor data to detect and track another vehicle 208, signs 210 or 212, an intersecting road 214, debris in the roads, animals, people, or other objects. In one embodiment, the viewing area 204 may be logically subdivided into a plurality of regions or cells to create a logical grid. Detection of objects may be performed by detecting objects within a specific cell. The vehicle 202 may then know whether or not to avoid a cell based on whether an object or obstacle was detected there.

In addition to perception data, the vehicle 202 may obtain information from a stored map, stored driving history, or from wireless signals. For example, an infrastructure transmitter 206 is shown near the road 200, which may provide specific positioning, environmental attribute details, or other information to the vehicle. As further examples, the vehicle 202 may receive information from other vehicles, such as vehicle 208, or from a wireless communication network. Based on the information received, the vehicle 202 may determine a location, velocity, identity, or the like about one or more detected objects or may update an algorithm or joint-probabilistic graphical model.

Figure 3:
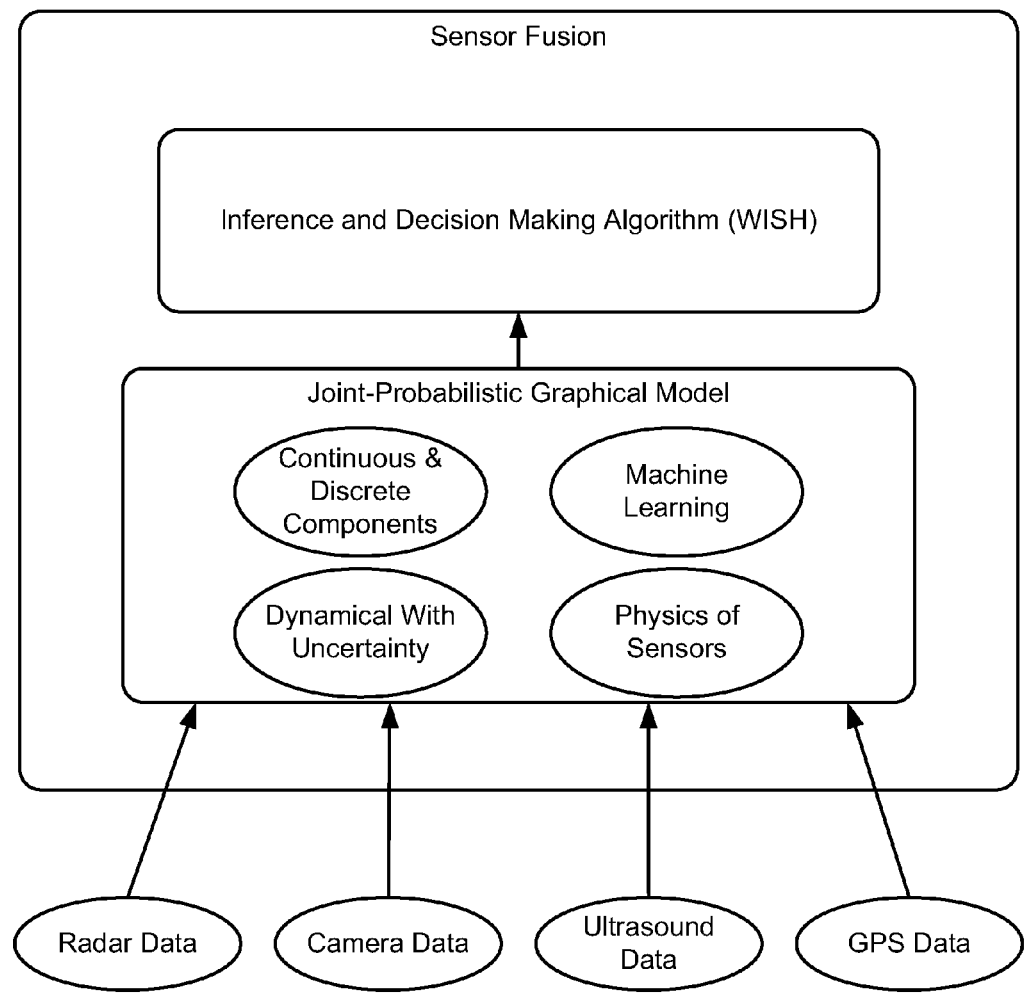
FIG. 3 is a schematic block diagram illustrating a sensor fusion algorithm, according to one implementation.

FIG. 3 is a schematic block diagram illustrating data flow and features of a sensor fusion algorithm. Sensor data from radar, camera, ultrasound, GPS, and/or other sensors may be received for sensor fusion. A joint-probabilistic graphical model includes nodes, edges or connections reflecting dependent (or independent) relationships, and tables or values that reflect probabilities at each node or for relationships between nodes. For example, one or more nodes may represent a measured sensor value for specific sensors and one or more other nodes may represent binary occupancy for a specific region.

The values and organization for the relationships (edges) and nodes in the joint-probabilistic graphical model may reflect continuous and discrete components or aspects of a vehicle or a sensor system. For example, continuous components or parameters may include those that can take on a continuous number of different values such as speed, distance, location, x-coordinate, y-coordinate, z-coordinate, velocity, or the like. Examples of discrete components or parameters include those that can take on two or more specific values (e.g., predefined states such as true/false, or one of a plurality of identification categories) such as sensor failure status, object identification (e.g., vehicle, animal, pedestrian, cyclist, curb, tree, debris, etc.), occupancy of a cell in a logical grid (present or not present), or the like.

The values and organization for the relationships and nodes in the joint-probabilistic graphical model may include values determined or updated using machine learning. For example, during creation of the model the values and/or relationships between nodes may be created or modified based on relationships or values detected during machine learning. Machine learning may be used to process large amounts of actual sensor data with respect to known (or accurate) values for one or more relationships that a vehicle will detect or track later. In one embodiment, a unidirectional graphical model may be generated with functions having unknown or estimated parameters describing correlations or relationships between nodes. Using machine learning, values for the unknown or estimated parameters may be determined or refined. For example, after the structure of the graphical model is determined, the WISH algorithm may be used to iterate over real-world or virtual-world sensor data to generate values for unknown or estimated parameters.

Furthermore, after the occurrence of driving events has taken place, when greater detail or accuracy is obtained, the comparison of accuracy of any inferences obtained through sensor fusion may be compared to the greater detail or accuracy obtained later (e.g., after an event has ended and more accurate results are obtained). Modifications to the joint-probabilistic model may be made to improve the accuracy of the model with respect to the driving events.

The values and organization for the relationships and nodes in the joint-probabilistic graphical model may include values reflecting the dynamics and uncertainty for a vehicle, a sensor system, and/or a specific sensor. For example, the relationships may indicate how a value measured by one sensor for a specific object relates to a value measured by a different sensor (e.g., a different sensor type) for the same specific object. Furthermore, the values may reflect how measurements by sensors change based on temperature, lighting levels, weather conditions, or the like. Uncertainty in a dynamical system can occur due to two reasons: the first is noise in the sensor measurements representing the state of the system; and the second is noise in the state of the system itself (e.g., the system may not move according to the model defining its motion (for example, a vehicle traveling in a straight line)).

The values and organization for the relationships and nodes in the joint-probabilistic graphical model may reflect laws of physics, which bound operation of a vehicle or a sensor system. For example, physical limitations on the movements of vehicles (or other objects) as well as the physical limitations on sensors may also be reflected by values, relationships, and nodes in the joint-probabilistic graphical model. For example, functions for edges that describe relationships between nodes may be generated to eliminate results that are not possible in the real world based on physical laws and limitations of vehicle movement and/or the sensors.

The sensor data may then be processed based on the joint-probabilistic graphical model using an inference and decision making algorithm, such as the WISH algorithm. In one embodiment, the WISH algorithm may be used to detect the presence of an object within one or more cells of a logical grid of an area near a vehicle. Systems of many random variables may take on an exponential number of possible joint configurations (random variable settings). This presents a problem because inference often requires computation of a partition function, which is a weighted sum over all (which may be exponentially many) configurations. The WISH algorithm, as used herein, approximates (with rigorous approximation bounds) this intractable counting problem using a small number of comparatively easier optimization problems. Moreover, the WISH algorithm can be parallelized for efficient computation during driving or operation of a vehicle. Model selection further compounds the dimensionality problem of inference, primarily because evaluating a particular parameter setting entails computing the partition function anew. The application of the WISH algorithm as presented herein enables tractable and automatic generation of information fusion models for novel multi-sensor platforms, which may be especially useful when one has limited domain knowledge over how to weight the information from disparate sensors in a given context.

Figure 4:
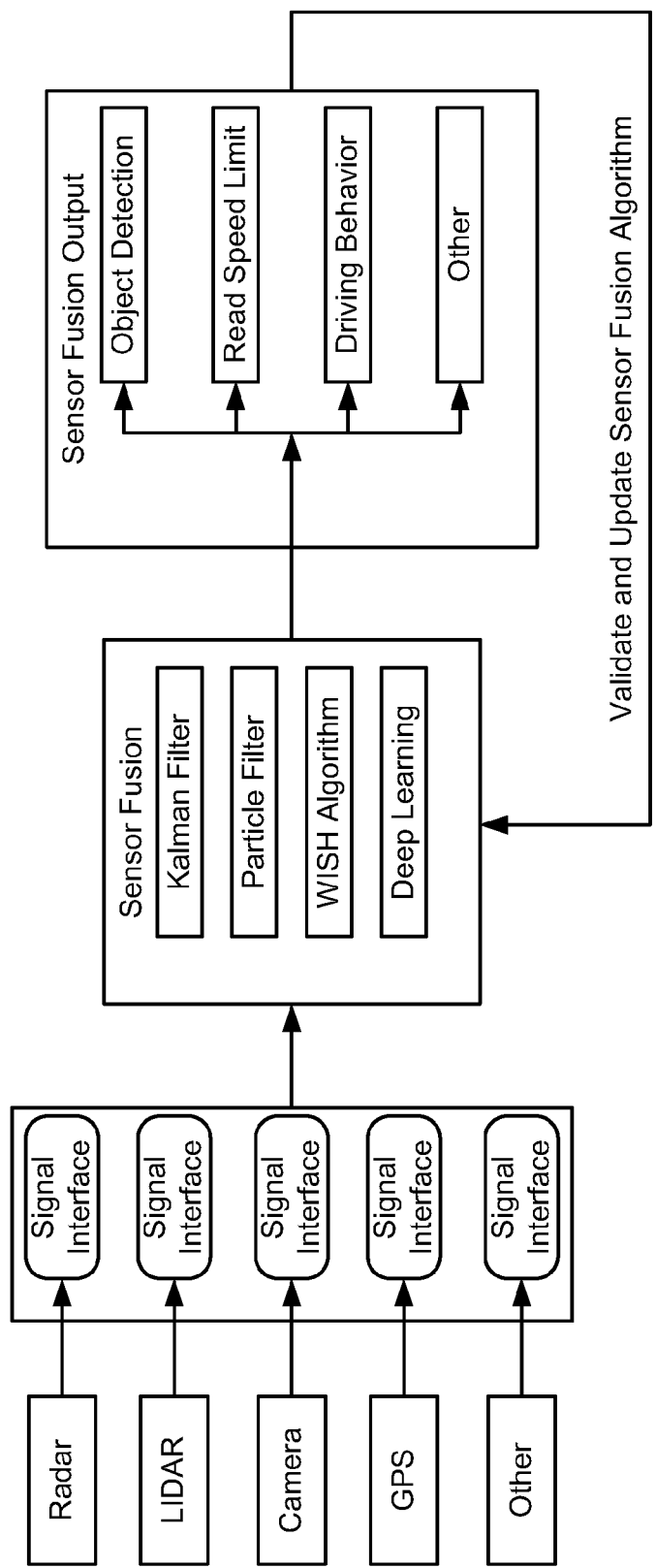
FIG. 4 is a schematic block diagram illustrating sensor fusion, according to one implementation.

FIG. 4 is a schematic block diagram illustrating one embodiment of sensor fusion using a WISH algorithm.

Radar, LIDAR, camera, GPS, and other systems may provide information via respective signal interfaces. Sensor fusion takes place with the information from the sensors or measurement systems. The sensor fusion may use a Kalman filter, a particle filter, a WISH algorithm, and/or deep learning algorithms to produce inferred values for object detection, speed limits, driving behavior decisions, probability or confidence values, or other values that may be helpful for an automated driving/assistance system 102. Based on the sensor fusion output, and/or any known information about an event, the accuracy of the inferred values may be validated and/or the sensor fusion algorithm may be updated. For example, a probabilistic graphical model may be updated based on the additional data gathered during a real or virtual driving event.

A graphical model may be used for modeling a sensor system. In one embodiment, the probabilistic graphical model for this approach would possibly be an undirected graphical model. The nodes of the graphical model may include collections of random variables. In one embodiment, the nodes would capture binary random variables like occupancy (e.g., of a cell of a logical grid representing a region near a sensor or a vehicle), categorical variables like material type, continuous variables like reflectivity and spectral signature, or the like. The edges may describe how pairs of random variables correlate with each other. For example, on every edge in the graph a compatibility function may describe how the nodes are connected. Parameters developed via machine learning may help describe these functions, which can capture physics of the different sensing modalities (e.g., of LIDAR, radar, camera, or the like).

In one embodiment, nodes in the system may represent binary variables describing occupancy at different points or regions. For example, an area near a vehicle may be logically divided up into a grid with a node representing occupancy within a specific region or cell of the grid. The edges may include corresponding joint probability distribution functions (PDF) that describe a mathematical relationship between two nodes. The joint PDFs may include parameters (like noise levels for different sensor measurements) that are learned. Another example could be learning the characteristic scale of different objects in the environment over time using parameters that describe the material properties of the objects etc.

The WISH algorithm could be used during preparation and design of a graphical model (e.g., during an offline phase) and/or could be used during active operations of a vehicle for object tracking and decision making (e.g., during an online phase). As used herein, the term "online" refers to a sensor system that is actively assisting driving of a vehicle; while the term "offline" refers to a sensor system that is not actively assisting driving of a vehicle. For example, before a graphical model is finalized it may be used as a model for machine learning, testing, or the like during an offline phase. Once the graphical model is installed in a vehicle it may be used by the vehicle during active driving scenarios during an online phase.

In the offline "learning" phase, the WISH algorithm may be provided with pre-collected sensor data or modeled sensor data and the structure of the graphical model and its parameterization, but not the parameter values. The WISH algorithm would help learn the parameters of the graphical model in an iterative fashion going over the pre-collected virtual or real data. Once the probabilistic graphical model parameters are learned, the WISH algorithm would be provided with the data from various sensors during active driving or operation of a vehicle (e.g., during an online phase). The WISH algorithm may then use the data from the sensors in conjunction with the structure and learned parameters of the graphical model. The WISH algorithm would process this data and then provide an inference output that includes a probability of occupancy of a certain grid cell, its velocity, or other information about a grid cell or object in the grid cell. This information would then be used for detecting and tracking objects around the vehicle during driving.

Figure 5:
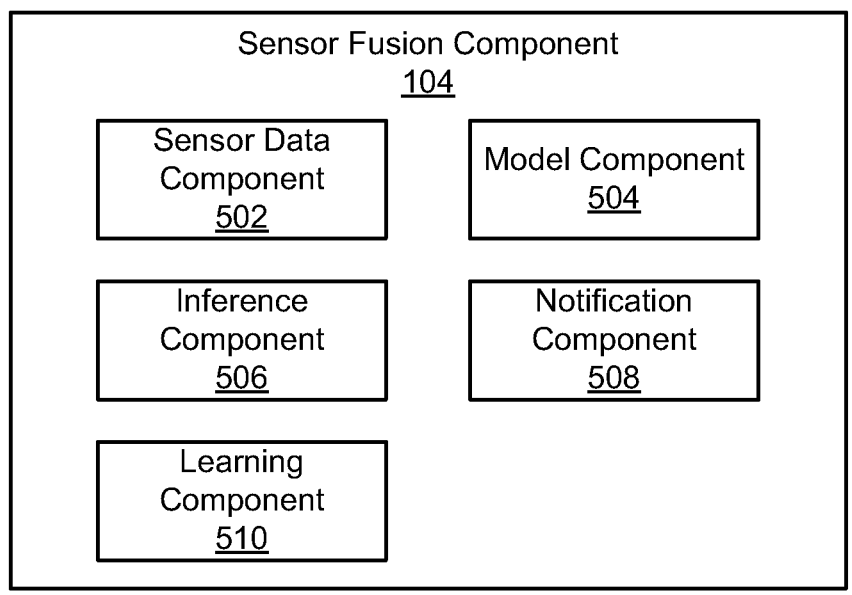
FIG. 5 is a schematic block diagram illustrating subcomponents of a sensor fusion component, according to one implementation.

FIG. 5 is a schematic block diagram illustrating subcomponents of a sensor fusion component 104, according to one embodiment. The sensor fusion component 104 includes a sensor data component 502, a model component 504, an inference component 506, a notification component 508, and a learning component 510. The components 502-510 are given by way of illustration only and may not all be included in all embodiments. In fact, some embodiments may include only one or any combination of two or more of the components 502-510. Some of the components 502-510 may be located outside the sensor fusion component 104, such as within the automated driving/assistance system 102 or elsewhere.

The sensor data component 502 is configured to receive sensor data from one or more sensors. In one embodiment, the sensor data may include perception data from one or more perception sensors for observing a region near a vehicle. The perception data may include data produced by one or more of a camera system 110, a radar system 106, a LIDAR system 108, an ultrasound system 114, or any other system. In one embodiment, the perception data may include sensor measurements for one or more regions near the vehicle. The sensor data may also include information from one or more sensors on the vehicle including information from a GPS system 112, wheel encoders, or any other systems that gather data about a location or movement of a vehicle.

The model component 504 models a sensing system of a vehicle, for example, a vehicle in which the sensor fusion component 104 or automated driving/assistance system 102 is located. In one embodiment, the model component 504 may store or calculate a graphical model that models operations, relationships, and/or values for a plurality of sensors of the vehicle. The graphical model may include nodes that correspond to one or more continuous variables for an object detected by two or more sensors, such as reflectivity and spectral signature of an obstacle. The graphical model may include nodes that correspond to one or more categorical variables for an obstacle, such as an object type and a material type. The graphical model may include nodes that correspond to one or more binary variables, such as occupancy of a cell by an object. The graphical model may include one or more edges or connections between nodes that indicate a relationship between the variables represented by the nodes. In one embodiment, the model may include a function for calculating a value at a node based on the sensor data. The function may include one or more parameters that reflect machine learning or measured relationships between nodes or between sensor data and/or calculation relationships between sensor measurements and modeled variables. In one embodiment, one or more parameters may be determined via machine learning based on real-world or virtual data and known ground truth from a real or virtual environment. In one embodiment, the model includes joint probabilistic functions for one or more edges describing how nodes corresponding to the edges are mathematically related. The parameters of the model may be machine learned or may be calculated based on deterministic constraints based on physical laws for the vehicle and/or probabilistic values for confidence levels for detecting and tracking the physical objects based on uncertainty in sensor measurements.

In one embodiment, a region near or surrounding a vehicle may be logically divided into a two-dimensional or three-dimensional grid having a plurality of cells. The grid may include a square, circular, oval, spherical, or any other type of grid. In one embodiment, each cell of the grid may have a corresponding node in a graphical model, which models for an occupancy (e.g., presence of an object in that cell), velocity, material type, object recognition, or any other object detection and tracking information. For example, each cell of the grid may correspond to a specific region near a vehicle (e.g., with a fixed location with respect to a moving vehicle) and one or more aspects of an object (or absence of an object) may be inferred for that cell based on the model and the most recently gathered sensor data.

In one embodiment, the graphical model may be stored in computer readable media, such as in the data store 116 of FIG. 1. In one embodiment, the model component 504 may retrieve the graphical model from memory. In one embodiment, the model component 504 may calculate values for each node of the graphical model based on recent sensor data and the functions in the model. For example, the graphical model may include variables for which sensor measurements may be substituted to calculate a value for each specific node of the graphical model. The model component 504 may provide the model with calculated values to the inference component 506 for inferring information about the position, speed, identity, or other aspects of a detected object. In one embodiment, the model component 504 may provide the model and the sensor data to the inference component 506.

The inference component 506 is configured to infer information about the presence or absence of obstacles and/or properties of detected obstacles. In one embodiment, the inference component 506 is configured to process the sensor data and the model using a dimensionality reduction algorithm to detect and track physical objects. For example, the inference component 506 may determine whether an object (such as a vehicle, person, animal, curb, tree, or any other obstacle) is present at a specific location with relation to a vehicle. In one embodiment, the inference component 506 may determine an identity of the object, a speed or velocity of the object, a predicted behavior of the object, or the like. In one embodiment, the inference component 506 may determine a probability of accuracy for a specific inference.

In one embodiment, the inference component 506 may use the WISH algorithm to process the sensor data and a graphical model to determine one or more inferences. For example, the inference component 506 may perform hashes and sums on the model and/or sensor values to determine whether an obstacle is present and other information about the vehicle.

The notification component 508 is configured to provide one or more inferences determined by the inference component 506 to an automated driving/assistance system 102. For example, the notification component 508 may provide cell values of a grid corresponding to a region surrounding a vehicle to the automated driving/assistance system 102. For example, each cell may include an indication of occupancy, a velocity of a detected object, an object classification, and/or a probability value for probability, velocity, or classification. In one embodiment, the automated driving/assistance system 102 may make decisions based on the inferences and probabilities provided by the sensor fusion component 104. In one embodiment, the notification component 508 may provide a location or a velocity of the physical objects to an automated driving/assistance system 102. In one embodiment, the automated driving/assistance system 102 may select a driving path based on the detection and tracking of the physical objects.

The learning component 510 is configured to perform machine learning to update operation of the sensor fusion component 104. In one embodiment, the learning component 510 is configured to update a model or algorithm used by the modeling component 504. For example, the learning component 510 may generate or modify at least a portion of the model based on machine learning for known locations of obstacles detected by one or more sensors and based on causal or deterministic constraints for known physical laws relating to the sensors or driving of the vehicle. In one embodiment, the learning component 510 may modify a parameter, function, or structure of the model based on machine learning for one or more driving events experienced by the vehicle. For example, sensors may be used to gather sensor data during a driving event. During the driving event, inferences determined by the inference component 506 may be made and used for driving the vehicle. After the event has ended, additional information may be available, which was not necessarily available during the event. For example, more accurate calculations regarding what really happened during an event may be performed or the results of an event may be detected. Using this more accurate, additional information, or the result, the learning component 510 may revise parameters or other aspects of a model to improve operation of the model component 504 and inference component 506. Similarly, the learning component 510 may update an algorithm used by the inference component 506 to infer details based on sensor data and/or a graphical model.

Figure 6:
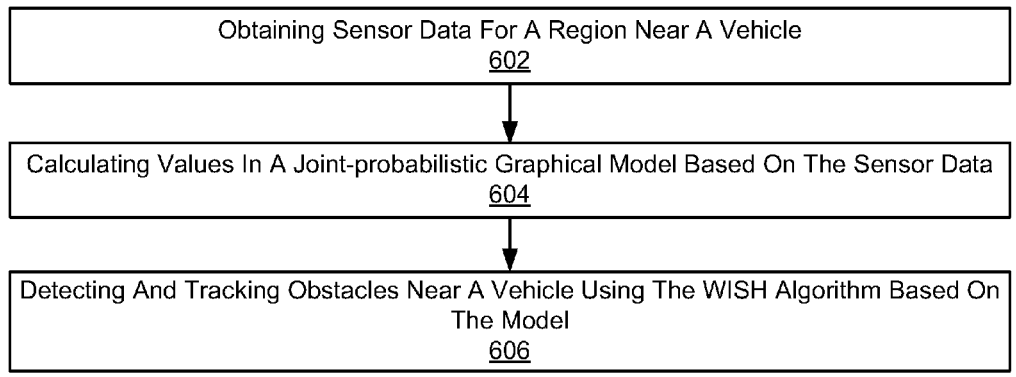
FIG. 6 is a schematic block diagram illustrating a method for sensor fusion, according to one implementation.

Referring now to FIG. 6, a schematic flow chart diagram of a method 600 for sensor fusion is illustrated. The method 600 may be performed by an automated driving/assistance system or a sensor fusion component, such as the automated driving/assistance system 102 of FIG. 1 or the sensor fusion component 104 of FIG. 1 or 5.

The method 600 begins as the sensor data component 502 obtains sensor data for a region near a vehicle from two or more sensors at 602. For example, the sensor data component 502 may obtain 602 the sensor data from a radar system 106, a LIDAR system 108, a camera system 110, a GPS 112, an ultrasound system 114, a wheel encoder, or any other sensor that is observing a region near a vehicle. The model component 504 calculates values in a joint-probabilistic graphical model based on the sensor data at 604. The graphical model may include nodes that correspond to random variables and edges indicating correlations between the nodes. In one embodiment, one or more functions may describe how to calculate a value for a node based on sensor data and relationships with other nodes. The inference component 506 detects and tracks obstacles near a vehicle based on the sensor data and the model using a WISH algorithm at 606. For example, the inference component 506 may detect and track obstacles using hashing functions and weighted sums to estimate the detection, position, and/or velocity of objects near the vehicle.

Figure 7:
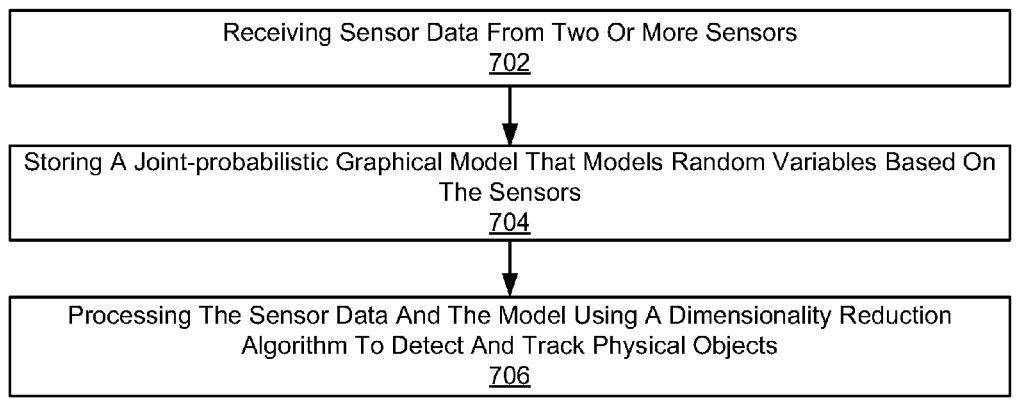
FIG. 7 is a schematic block diagram illustrating a method for sensor fusion, according to another implementation.

Referring now to FIG. 7, a schematic flow chart diagram of a method 700 for sensor fusion is illustrated. The method 700 may be performed by an automated driving/assistance system or a sensor fusion component, such as the automated driving/assistance system 102 of FIG. 1 or the sensor fusion component 104 of FIG. 1 or 5.

The method 700 begins as the sensor data component 502 receives sensor data from two or more sensors for a region near a vehicle at 702. The model component 504 stores a joint-probabilistic graphic model that models random variables and relationships between the random variables based on the two or more sensors at 704. In one embodiment, the model logically divides the region near the vehicle into a grid and a plurality of nodes of the graphical model represent a binary occupancy of respective cells of the grid. The inference component 506 processes the sensor data and the model using a dimensionality reduction algorithm to detect and track physical objects at 706. For example, the inference component 506 may process the sensor data and model using a WISH algorithm.

EXAMPLES

The following examples pertain to further embodiments.

Example 1 is a system that includes two or more sensors configured to obtain sensor data. The system also includes a model component and an inference component. The model component is configured to calculate values in a joint-probabilistic graphical model based on the sensor data. The graphical model includes nodes corresponding to random variables and edges indicating correlations between the nodes. The inference component is configured to detect and track obstacles near a vehicle based on the sensor data and the model using a WISH algorithm.

In Example 2, the inference component of Example 1 further determines a confidence bounds for one or more of a speed, a position, and a velocity of an obstacle relative to the vehicle.

In Example 3, one or more of the nodes in any of Examples 1-2 correspond to an occupancy of a cell in a grid describing a region observed by the two or more sensors and the inference component determines one or more of a probability that the cell is occupied by an object and a velocity of the object occupying the cell.

In Example 4, one or more of the nodes in any of Examples 1-3 correspond to one or more continuous variables for an object detected by the two or more sensors. The continuous variables include one or more of reflectivity and spectral signature of an obstacle.

In Example 5, one or more of the nodes in any of Examples 1-4 correspond to one or more categorical variables for an obstacle. The categorical variables include one or more of an object type and a material type.

In Example 6, the model in any of Examples 1-5 includes a function for calculating a value at a node based on the sensor data. The function includes a predetermined machine learning parameter to calculate the value.

In Example 7, the model in any of Examples 1-6 includes joint probabilistic functions for one or more edges describing how nodes corresponding to the edges are mathematically related.

In Example 8, the system of any of Examples 1-7 further includes a storage component to store the joint-probabilistic graphical model.

In Example 9, the system of any of Examples 1-8 further include a learning component configured to generate or modify at least a portion of the model based on machine learning for known locations of obstacles detected by one or more sensors and based on causal or deterministic constraints for known physical laws relating to the sensors or driving of the vehicle.

In Example 10, the two or more sensors in any of Examples 1-9 include one or more of a LIDAR system, a camera system, an ultrasound system, a positioning system, and wheel encoders.

Example 11 is a method implemented by a computing device. The method includes receiving sensor data from two or more sensors for a region near a vehicle. The method includes storing a joint-probabilistic graphic model that models random variables and relationships between the random variables based on the two or more sensors. The model logically divides the region near the vehicle into a grid and a plurality of nodes of the graphical model represent a binary occupancy of respective cells of the grid. The method includes processing the sensor data and the model using a dimensionality reduction algorithm to detect and track physical objects.

In Example 12, the dimensionality reduction algorithm of Example 11 includes a WISH algorithm.

In Example 13, the method of any of Examples 11-12 further includes providing a location or a velocity of the physical objects to an automated driving system or automated assistance system.

In Example 14, the method of any of Examples 11-13 further includes selecting a driving path, using the processor, based on the detection and tracking of the physical objects.

In Example 15, the model of any of Examples 11-14 includes parameters determined based on one or more of deterministic constraints based on physical laws for the vehicle and probabilistic values for confidence levels for detecting and tracking the physical objects.

In Example 16, the method of any of Examples 11-15 further includes modifying at least a portion of the model based on machine learning for one or more driving events experienced by the vehicle.

Example 17 is computer readable storage media storing instructions that, when executed by one or more processors, cause the processors to: receive sensor data for a region near a vehicle from two or more sensors; store a joint-probabilistic graphic model that models random variables and relationships between the random variables based on the two or more sensors; and process the sensor data based on the joint-probabilistic graphic model to detect and track one or more physical objects near the vehicle. Processing the sensor data involves processing based on the joint-probabilistic graphic model using a WISH algorithm.

In Example 18, the computer readable storage media of Example 17 further includes instructions that cause the processor to provide a location or a velocity of the one or more physical objects to an automated driving system or automated assistance system of the vehicle.

In Example 19, processing the sensor data in any of Examples 17-18 includes processing the sensor data based on one or more virtual environments indicated by the model.

In Example 20, the model of any of Examples 17-19 logically divides the region near the vehicle into a grid, and a plurality of nodes of the graphical model represent an occupancy of respective cells of the grid. Processing the sensor data based on the joint-probabilistic graphic model includes processing to determine probability of occupancy in each cell with a confidence bounds.

Example 21 is a system or apparatus that includes means for implementing or realizing any of Examples 1-20.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
   two or more sensors configured to obtain sensor data;
   a model component configured to calculate values in a joint-probabilistic graphical model based on the sensor data, wherein the graphical model comprises nodes corresponding to random variables and edges indicating correlations between the nodes;
   an inference component configured to detect and track obstacles near a vehicle based on the sensor data and the model using a weighted-integrals-and-sums-by-hashing (WISH) algorithm; and
   an automated driving system or an automated assistance system of the vehicle configured to execute a driving path for the vehicle based on the detected and tracked obstacles near the vehicle.

2. The system of claim 1, wherein the inference component determines a confidence bounds for one or more of a speed, a position, and a velocity of an obstacle relative to the vehicle.

3. The system of claim 1, wherein one or more of the nodes correspond to an occupancy of a cell in a grid describing a region observed by the two or more sensors; and wherein the inference component determines one or more of a probability that the cell is occupied by an object, and a velocity of the object occupying the cell.

4. The system of claim 1, wherein one or more of the nodes correspond to one or more continuous variables for an object detected by the two or more sensors, wherein the continuous variables comprise one or more of reflectivity and spectral signature of an obstacle.

5. The system of claim 1, wherein one or more of the nodes correspond to one or more categorical variables for an obstacle, wherein the categorical variables comprise one or more of an object type and a material type.

6. The system of claim 1, wherein the model comprises a function for calculating a value at a node based on the sensor data, wherein the function comprises a predetermined machine learning parameter to calculate the value.

7. The system of claim 1, wherein the model includes joint probabilistic functions for one or more edges describing how nodes corresponding to the edges are mathematically related.

8. The system of claim 1, further comprising a storage component to store the joint-probabilistic graphical model.

9. The system of claim 1, further comprising a learning component configured to generate or modify at least a portion of the model based on machine learning for known locations of obstacles detected by one or more sensors and based on causal or deterministic constraints for known physical laws relating to the sensors or driving of the vehicle.

10. The system of claim 1, wherein the two or more sensors comprises one or more of a light detection and ranging (LIDAR) system, a camera system, an ultrasound system, a positioning system, and wheel encoders.

11. A method implemented by a computing device, the method comprising:
    receiving sensor data from two or more sensors for a region near a vehicle;
    storing a joint-probabilistic graphic model that models random variables and relationships between the random variables based on the two or more sensors, wherein the model logically divides the region near the vehicle into a grid, and wherein a plurality of nodes of the graphical model represent a binary occupancy of respective cells of the grid;
    processing the sensor data and the model using a dimensionality reduction algorithm to detect and track physical objects;
    selecting a driving path based on the detection and tracking of the physical objects; and
    providing the driving path to an automated driving system or automated assistance system of the vehicle for executing the driving path by the vehicle.

12. The method of claim 11, wherein the dimensionality reduction algorithm comprises a weighted-integrals-and-sums-by-hashing (WISH) algorithm.

13. The method of claim 11, further comprising providing a location or a velocity of the physical objects to the automated driving system or the automated assistance system.

14. The method of claim 11, further comprising determining a confidence bounds for one or more of a speed, a position, and a velocity of a physical object relative to the vehicle.

15. The method of claim 11, wherein the model comprises parameters that are determined based on one or more of deterministic constraints based on physical laws for the vehicle and probabilistic values for confidence levels for detecting and tracking the physical objects.

16. The method of claim 11, further comprising modifying at least a portion of the model based on machine learning for one or more driving events experienced by the vehicle.

17. Non-transitory computer readable storage media storing instructions that, when executed by one or more processors, cause the one or more processors to:
- receive sensor data for a region near a vehicle from two or more sensors;
- store a joint-probabilistic graphic model that models random variables and relationships between the random variables based on the two or more sensors;
- process the sensor data based on the joint-probabilistic graphic model to detect and track one or more physical objects near the vehicle, wherein processing the sensor data comprises processing based on the joint-probabilistic graphic model using a weighted-integrals-and-sums-by-hashing (WISH) algorithm;
- select a driving path based on the detection and tracking of the one or more physical objects near the vehicle; and
- providing the driving path to an automated driving system or automated assistance system of the vehicle for executing the driving path by the vehicle.

18. The non-transitory computer readable storage media of claim 17, further comprising instructions configured to cause the one or more processors to provide a location or a velocity of the one or more physical objects to the automated driving system or the automated assistance system of the vehicle.

19. The non-transitory computer readable storage media of claim 17, wherein processing the sensor data comprises processing the sensor data based on one or more virtual environments indicated by the model.

20. The non-transitory computer readable storage media of claim 17, wherein the model logically divides the region near the vehicle into a grid, and wherein a plurality of nodes of the graphical model represent an occupancy of respective cells of the grid, wherein processing the sensor data based on the joint-probabilistic graphic model comprises processing to determine probability of occupancy in each cell with a confidence bounds.

* * * * *